US011307099B2

(12) United States Patent
Atwood et al.

(10) Patent No.: US 11,307,099 B2
(45) Date of Patent: Apr. 19, 2022

(54) OBJECT PRINTED BY A 3D PRINTER AND A METHOD FOR DETERMINING THE TEMPERATURE OF THE OBJECT

(71) Applicant: XEROX CORPORATION, Norwalk, CT (US)

(72) Inventors: Christopher Douglas Atwood, Rochester, NY (US); Erwin Ruiz, Rochester, NY (US); David M. Kerxhalli, Rochester, NY (US); Douglas K. Herrmann, Webster, NY (US); Linn C. Hoover, Webster, NY (US); Derek A. Bryl, Webster, NY (US); Ali R. Dergham, Fairport, NY (US)

(73) Assignee: XEROX CORPORATION, Norwalk, CT (US)

( * ) Notice: Subject to any disclaimer, the term of this patent is extended or adjusted under 35 U.S.C. 154(b) by 167 days.

(21) Appl. No.: 16/903,835

(22) Filed: Jun. 17, 2020

(65) Prior Publication Data
US 2021/0396593 A1    Dec. 23, 2021

(51) Int. Cl.
*B33Y 50/00*    (2015.01)
*B64F 5/10*    (2017.01)
(Continued)

(52) U.S. Cl.
CPC .............. *G01K 1/14* (2013.01); *B33Y 50/00* (2014.12); *B33Y 80/00* (2014.12); *B64F 5/10* (2017.01); *G01K 7/04* (2013.01)

(58) Field of Classification Search
CPC . G01K 1/14; G01K 7/04; B33Y 50/00; B33Y 80/00; B64F 5/10
See application file for complete search history.

(56) References Cited

U.S. PATENT DOCUMENTS 11,199,456 B2 * 12/2021 DeKam .................. B33Y 80/00
2005/0287386 A1 * 12/2005 Sabol ..................... F01D 17/02
(Continued)

FOREIGN PATENT DOCUMENTS

DE    102018212949 A1    2/2020
WO    2018/194482 A1    10/2018

OTHER PUBLICATIONS

Kousiatza et al., Temperature Mapping of 3D Printed Polymer Plates: Feb. 24, 2017: MDPI Basel, Switzerland, vol. 456: pp. 1-14 (Year: 2017).*

(Continued)

*Primary Examiner* — Lawrence Averick
(74) *Attorney, Agent, or Firm* — MH2 Technology Law Group LLP

(57) ABSTRACT

An object printed by a three-dimensional (3D) printer includes a plurality of layers of material printed by the 3D printer. The layers of material bond together to form the object as the layers of material cool and solidify after being printed by the 3D printer. The object also includes a temperature sensor placed in contact with one or more of the layers when the layers of material are being printed by the 3D printer. The temperature sensor remains in contact with the object after the layers of material cool and solidify to form the object. The temperature sensor is configured to measure a temperature of the object after the layers of material cool and solidify to form the object.

10 Claims, 12 Drawing Sheets

(51) Int. Cl.
*B33Y 80/00* (2015.01)
*G01K 1/14* (2021.01)
*G01K 7/04* (2006.01)

(56) References Cited

U.S. PATENT DOCUMENTS

2016/0305271 A1* 10/2016 Schmidt ................ F01D 17/085
2019/0113398 A1   4/2019 Comas et al.
2019/0308372 A1  10/2019 Fernandez Aymerich et al.

OTHER PUBLICATIONS

Extended European Search Report issued in related European Patent Application No. 21177430.2, 9 pages.
Kousiatza et al., "Temperature Mapping of 3D Printed Polymer Plates: Experimental and Numerical Study," MDPI, Sensors 2017, 17, 456 (14 pages).

* cited by examiner

OBJECT PRINTED BY A 3D PRINTER AND A METHOD FOR DETERMINING THE TEMPERATURE OF THE OBJECT

TECHNICAL FIELD

The present teachings relate generally to three-dimensional (3D) printing and, more particularly, to systems and methods for determining a temperature of an object printed by a 3D printer.

BACKGROUND

A 3D printing process builds a three-dimensional object from a computer-aided design (CAD) model, usually by successively depositing material layer upon layer. For example, a first layer may be deposited upon a substrate, and then a second layer may be deposited upon the first layer. The temperature of the first layer and the temperature of the material being deposited upon the first layer to form the second layer should each be within a predetermined range to enable the layers to properly bond together and have the desired properties.

Oftentimes, non-contact temperature sensors are used to monitor the temperature during the 3D printing process, so as to not obstruct or otherwise interfere with the 3D printing process. One type of non-contact temperature sensor that is used is called a pyrometer, which measures an emissivity of a surface of the object during the 3D printing process. The emissivity refers to an effectiveness of emitting heat energy as thermal radiation. The pyrometer has a memory with data stored therein that corresponds to the type of material being printed. Using the measured emissivity and the data corresponding to the type of material being printed, the pyrometer may determine (e.g., predict) the temperature of the object (e.g., using a look-up table).

However, the surface finish and/or the surface content of the material being printed may vary, which may cause the temperature determinations from the pyrometer to be inaccurate. Therefore, it would be beneficial to have an improved system and method for determining a temperature of an object printed by a 3D printer.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A system for determining a temperature of an object is disclosed. The system includes a three-dimensional (3D) printer configured to successively deposit a first layer of material, a second layer of material, and a third layer of material to form the object. The 3D printer is configured to form a recess in the second layer of material. The material is a metal. The system also includes a temperature sensor configured to be positioned at least partially with the recess and to have the third layer deposited thereon. The temperature sensor is configured to measure a temperature of the first layer of material, the second layer of material, the third layer of material, or a combination thereof.

A method for determining a temperature of an object is also disclosed. The method includes depositing a first layer of material onto a substrate using a three-dimensional (3D) printer. The method also includes positioning a temperature sensor on the first layer of material. The method also includes depositing a second layer of material onto the first layer of material and the temperature sensor using the 3D printer. The method also includes measuring a temperature of the first layer of material, the second layer of material, or both using the temperature sensor.

In another embodiment, the method includes depositing a first layer of material onto a substrate using a three-dimensional (3D) printer. The method also includes depositing a second layer of material onto the first layer of material using the 3D printer. The method also includes forming a recess in the second layer of material. The method also includes positioning a temperature sensor at least partially in the recess such that the temperature sensor is in contact with the first layer of material, the second layer of material, or both. The temperature sensor is a thermocouple that includes two electrical conductors that are made of different materials. The method also includes depositing a third layer of material onto the second layer of material and the temperature sensor using the 3D printer. The first layer of material, the second layer of material, and the third layer of material includes a metal. The method also includes measuring a temperature of the first layer of material, the second layer of material, the third layer of material, or a combination thereof using the temperature sensor.

An object printed by a three-dimensional (3D) printer is also disclosed. The object includes a plurality of layers of material printed by the 3D printer. The layers of material bond together to form the object as the layers of material cool and solidify after being printed by the 3D printer. The object also includes a temperature sensor placed in contact with one or more of the layers when the layers of material are being printed by the 3D printer. The temperature sensor remains in contact with the object after the layers of material cool and solidify to form the object. The temperature sensor is configured to measure a temperature of the object after the layers of material cool and solidify to form the object.

In another embodiment, the object includes a first layer of material printed by the 3D printer. The object also includes a second layer of material printed by the 3D printer onto the first layer of material. A recess is formed in the second layer of material. The object also includes a third layer of material printed by the 3D printer onto the second layer of material. The first, second, and third layers of material bond together to form the object as the first, second, and third layers of material cool and solidify after being printed by the 3D printer. The object also includes a first temperature sensor positioned at least partially within the recess when the first, second, and third layers of material are being printed by the 3D printer. The first temperature sensor remains positioned at least partially within the recess after the first, second, and third layers of material cool and solidify to form the object. The first temperature sensor is configured to measure a temperature of the object before and after the first, second, and third layers of material cool and solidify to form the object.

A method for determining a temperature of an object is also disclosed. The method includes printing the object using a three-dimensional (3D) printer. The method also includes measuring the temperature of the object using a first temperature sensor while the object is being printed by the 3D printer. The first temperature sensor is in contact with the object. The method also includes measuring the temperature of the object using the first temperature sensor after the object has been printed by the 3D printer.

A method for determining a temperature of an object is also disclosed. The method includes contacting the object with a first electrical conductor. A difference in electronegativity between the object and the first electrical conductor is greater than a predetermined value. The method also includes contacting the object or a substrate on which the object is positioned with a second electrical conductor. A difference in electronegativity between the object or the substrate and the second electrical conductor is less than the predetermined value. The method also includes connecting the first and second electrical conductors together. The method also includes measuring the temperature of the object using the first and second electrical conductors. The first and second electrical conductors form at least a portion of a thermocouple.

A method for determining a temperature differential between two portions of an object is also disclosed. The method includes contacting a first portion of the object with a first end of an electrical conductor. A difference in electronegativity between the object and the electrical conductor is greater than a predetermined value. The method also includes contacting a second portion of the object with a second end of the electrical conductor. The method also includes determining a temperature differential between the first and second portions of the object using the electrical conductor.

A method for determining a temperature differential between two portions of an object is also disclosed. The method includes contacting a first portion of the object with a first electrical conductor. A difference in electronegativity between the object and the first electrical conductor is greater than a predetermined value. The method also includes contacting a second portion of the object with a second electrical conductor. A difference in electronegativity between the object and the second electrical conductor is greater than the predetermined value. The method also includes connecting the first and second electrical conductors together. The method also includes determining a temperature differential between the first and second portions of the object using the first and second electrical conductors.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

Figure 1:
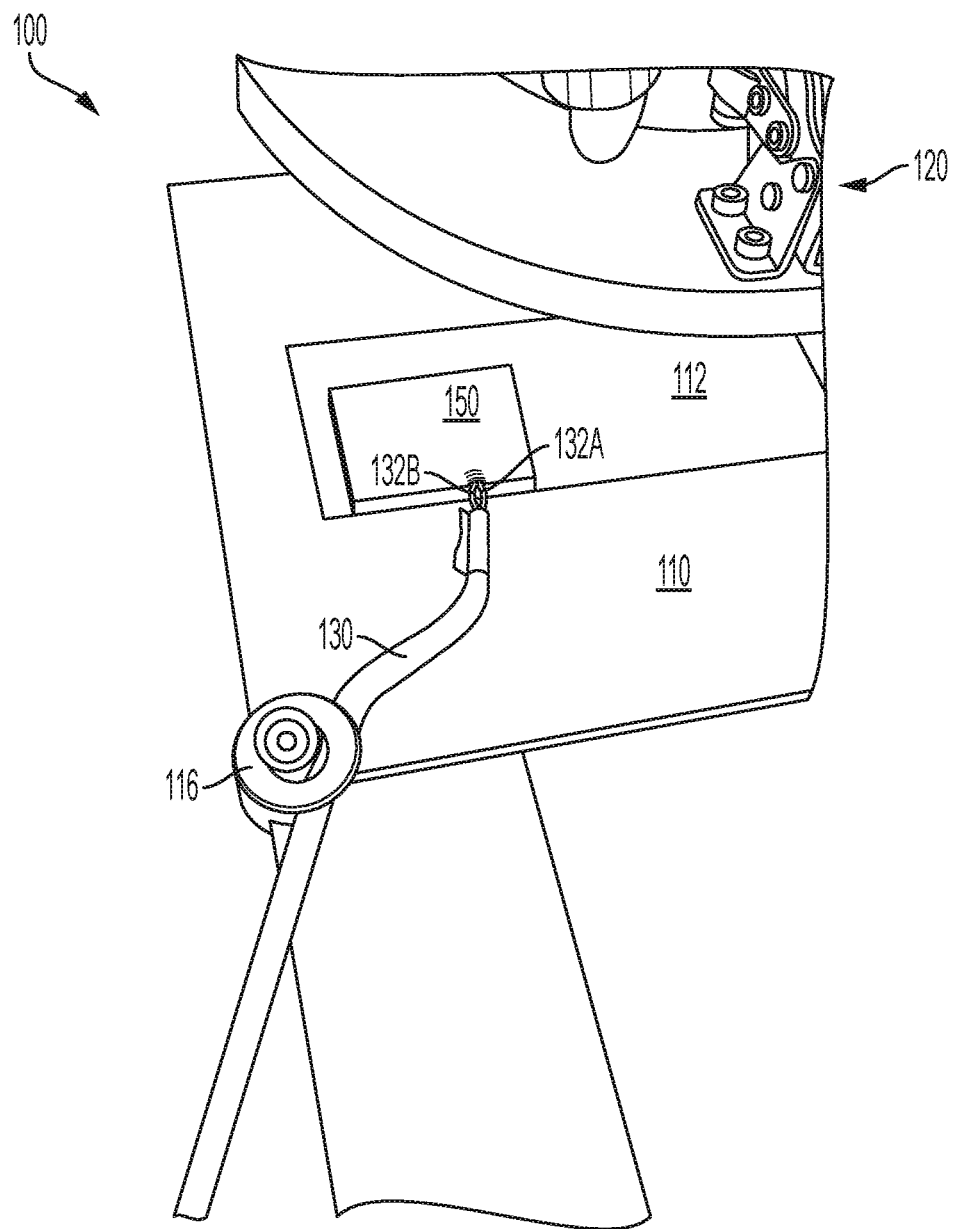
FIG. 1 depicts a perspective view of a system for determining a temperature of an object printed by a 3D printer, according to an embodiment.

FIG. 1 depicts a perspective view of a system 100 for determining a temperature of an object 150 printed by a 3D printer 120, according to an embodiment. The system 100 may include a support device 110. The support device 110 may be or include a flat surface such as a table. The system 100 may also include a substrate 112 positioned on the support device 110.

The system 100 may also include the 3D printer 120, which may be configured to print the object 150 on the substrate 112. The system 100 may also include a temperature sensor 130. The temperature sensor 130 may be or include a thermocouple, a thermistor, or another temperature sensor that may be placed in contact with the object 150 during and/or after the 3D printing process. The temperature sensor (e.g., thermocouple) 130 may produce a temperature-dependent voltage, and the temperature of the object 150 may be determined based at least partially upon the voltage. The system 100 may also include a securing device 116 which may be used to secure the temperature sensor 130 in place. In the embodiment shown, the securing device 116 may be or include a clamp that is coupled to the support device (e.g., table) 110, and the temperature sensor 130 may be secured in place between the support device (e.g., the table) 110 and the clamp. The securing device 116 may help to hold the temperature sensor 130 in contact with the object 150.

Figure 2A:
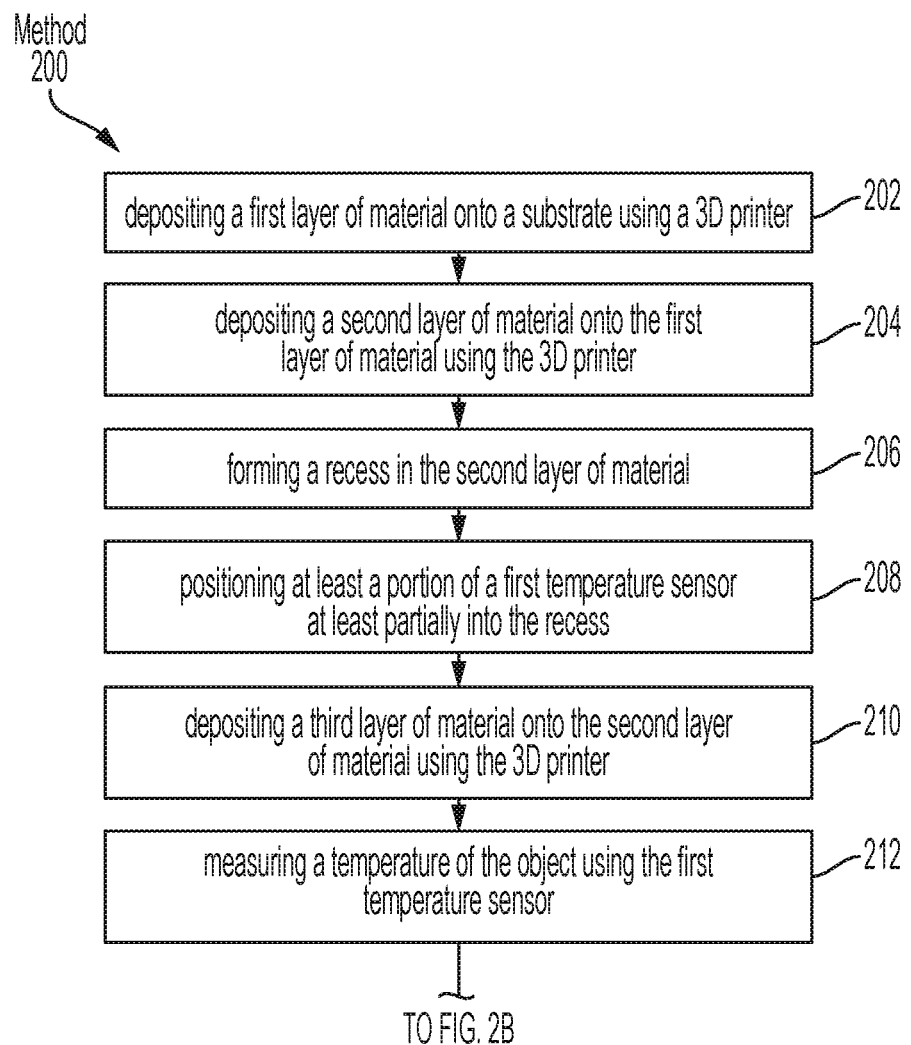
FIGS. 2A and 2B depict a flowchart of a method for determining the temperature of the object, according to an embodiment.
Figure 2B:
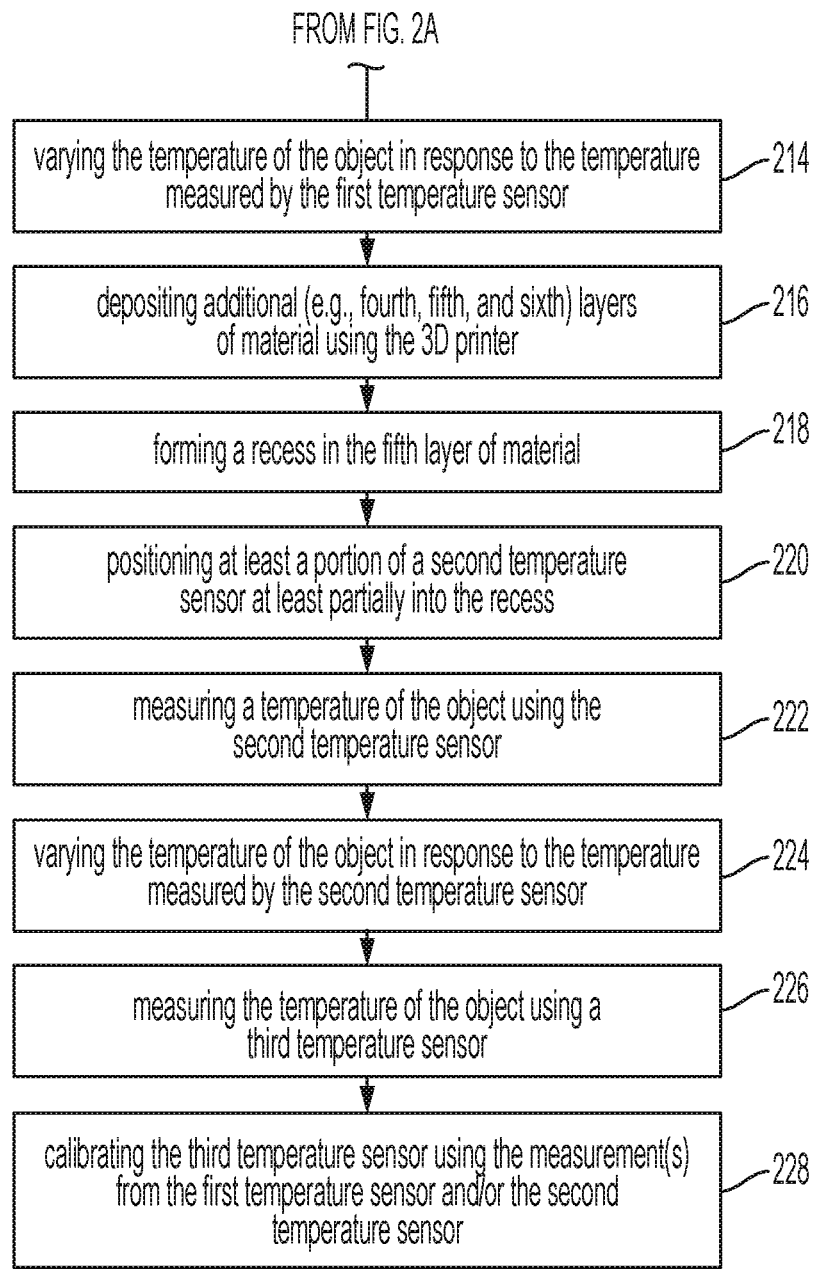

FIGS. 2A and 2B depicts a flowchart of a method 200 for determining the temperature of the object 150, according to an embodiment. An illustrative order of the method 200 is provided below; however, it will be appreciated that one or more steps of the method 200 may be repeated, performed in a different order, and/or omitted altogether.

Figure 3:
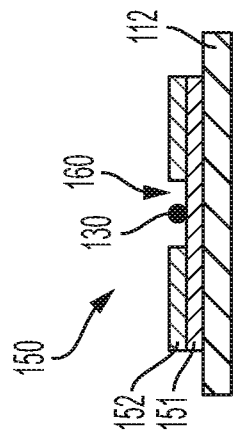
FIG. 3 depicts a perspective view of the 3D printer depositing a first layer of material on a substrate, according to an embodiment.

The method 200 may include depositing a first layer of material 151 onto the substrate 112 using the 3D printer 120, as at 202. This is shown in FIG. 3. The material may be or include a metal or a polymer. For example, the material may be or include aluminum, brass, bronze, steel, stainless steel, titanium, or a combination thereof. The first layer of material 151 may have a thickness from about 25 µm to about 500 µm or about 50 µm to about 250 µm.

Figure 4:
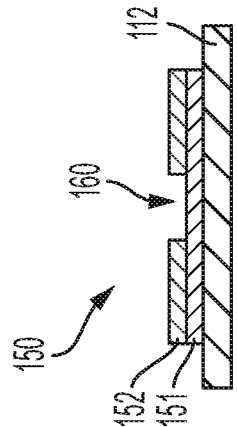
FIG. 4 depicts a perspective view of the 3D printer depositing a second layer of material on the first layer of material, according to an embodiment.

The method 200 may also include depositing a second layer of material 152 onto the first layer of material 151 using the 3D printer 120, as at 204. This is shown in FIG. 4. The second layer of material 152 may be or include the same type of material (e.g., aluminum) as the first layer of material 151. The second layer of material 152 may have substantially the same thickness as the first layer of material 151.

The method 200 may also include forming a recess 160 in the second layer of material 152, as at 206. This is also shown in FIG. 4. In one embodiment, the recess 160 may be formed by temporarily ceasing to deposit the material as the 3D printer 120 continues to move over the first layer of material 151. In other words, the recess 160 may be formed by the 3D printer 120. In another embodiment, the second layer of material 152 may be printed in a substantially uniform manner, and a portion of the second layer of material 152 may then be removed (e.g., manually) to form the recess 160.

Figure 5:
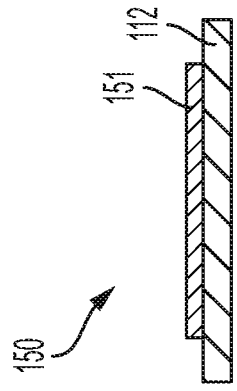
FIG. 5 depicts a perspective view of a temperature sensor being positioned at least partially within a recess formed in the second layer of material, according to an embodiment.

The method 200 may also include positioning at least a portion of a first temperature sensor 130 at least partially into the recess 160, as at 208. This is shown in FIG. 5. The first temperature sensor 130 may be or include a thermocouple that includes two electrical conductors 132A, 132B (see FIG. 1) that are made of different materials. In an example, the two electrical conductors 132A, 132B may be in contact with one another, such that a hot junction (e.g., conductor 132A) is formed within or in contact with the object 150, and a cold junction (e.g., conductor 132B) is formed away from the object 150. The property of dissimilarity of the metals may represent a difference in electronegativity. In another embodiment, the first temperature sensor 130 may also or instead be a thermistor (e.g., a glass-encapsulated thermistor). The electrical conductors 132A, 132B may have a length from about 2 mm to about 50 mm or about 5 mm to about 25 mm. The electrical conductors 132A, 132B may have a thickness from about 250 µm to about 1800 µm or about 500 µm to about 1000 µm.

The recess 160 may be sized and shaped based at least partially upon the size of the electrical conductors 132A, 132B. This may maximize the surface area of the electrical conductors 132A, 132B that is in contact with the first layer of material 151, the second layer of material 152, the third layer of material 153 (described below), or a combination thereof. For example, the length of the recess 160 may be substantially the same as the length of the electrical conductors 132A, 132B. In addition, the depth of the recess 160 may be substantially the same as the thickness of the electrical conductors 132A, 132B. In an embodiment where the thickness of the electrical conductors 132A, 132B is greater than the second layer of material 152, then the recess 160 may be formed in a plurality of stacked layers such that the depth of the recess 160 is substantially the same as the thickness of the electrical conductors 132A, 132B.

Figure 6:
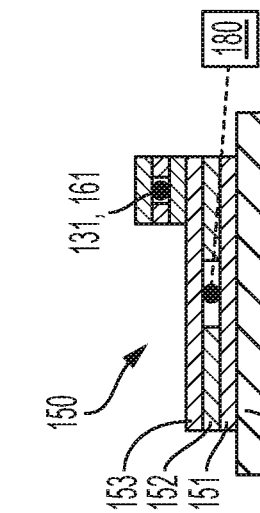
FIG. 6 depicts a perspective view of the 3D printer depositing a third layer of material on the second layer of material and the temperature sensor, according to an embodiment.

The method 200 may also include depositing a third layer of material 153 onto the second layer of material 152 using the 3D printer 120, as at 210. This is shown in FIG. 6. The third layer of material 153 may be or include the same type of material (e.g., aluminum) as the first layer of material 151 and/or the second layer of material 152. The third layer of material 153 may have substantially the same thickness as the first layer of material 151 and/or the second layer of material 152.

The third layer of material 153 may also be deposited onto the first temperature sensor 130 (e.g., the electrical conductors 132A, 132B). Thus, the first temperature sensor 130 (e.g., the electrical conductors 132A, 132B) may be in contact with (e.g., embedded at least partially within) the first layer of material 151, the second layer of material 152, and/or the third layer of material 153.

Placing the first temperature sensor 130 (e.g., the electrical conductors 132A, 132B) in the recess 160 may allow the third layer of material 153 to be substantially flat over the first temperature sensor 130. In at least one embodiment, the recess 160 may be omitted, and the first temperature sensor 130 may be placed on top of the first layer of material 151 and/or the second layer of material 152, and the third layer of material 153 may be deposited thereon; however, this may result in the portion of the third layer of material 153 that is positioned over the first temperature sensor 130 protruding slightly outward (e.g., upward).

The material may have a temperature from about 500° C. to about 800° C. or about 550° C. to about 700° C. when the material is discharged from the 3D printer 120 and deposited onto the substrate 112 and/or the previously-printed layer. The material may gradually cool down to below the melting point of the material, which allows the material to solidify to form the object 150. For example, the material may gradually cool to an ambient temperature between about 10° C. and about 30° C.

As the layers of material 151-153 are printed successively (i.e., one after the other), there may be a temperature differential between the layers of material 151-153 during the printing process. For example, the first layer of material 151 may have cooled down to a temperature from about 400° C. to about 650° C. or about 450° C. to about 550° C. as the second layer of material 152 is deposited onto the first layer of material 151. Similarly, the second layer of material 152 may have cooled down to a temperature from about 400° C. to about 650° C. or about 450° C. to about 550° C. as the third layer of material 153 is deposited onto the second layer of material 152.

The method 200 may also include measuring a temperature of the object 150 using the first temperature sensor 130, as at 212. The temperature may be measured during and/or after the 3D printing process. In one embodiment, the temperature of the first layer of material 151 may be measured before, simultaneously with, and/or after the second layer of material 152 is deposited thereon. In another embodiment, the temperature of the second layer of material 152 may be measured before, simultaneously with, and/or after the third layer of material 153 is deposited thereon. In another embodiment, the temperature of the third layer of material 153 may be measured simultaneously with and/or after the third layer of material 153 is deposited. In yet another embodiment, the temperature of the first layer of material 151, the second layer of material 152, the third layer of material 153, or a combination thereof may be measured after the object 150 has finished cooling (e.g., at an ambient temperature) and/or after the object 150 has solidified.

Measuring the temperature of the object 150 may also or instead include measuring the temperature differential between the first layer of material 151 and the second layer of material 152, between the second layer of material 152 and the third layer of material 153, between the first layer of material 151 and the third layer of material 153, or a combination thereof using the first temperature sensor 130. In at least one embodiment, measuring the temperature differential may include using two or more temperature sensors that are in contact with different layers of material. For example, a first temperature sensor (e.g., thermocouple) may be positioned in contact with and/or at least partially between the first layer of material 151 and the second layer of material 152, and a second temperature sensor (e.g., thermocouple) may be positioned in contact with and/or at least partially between the second layer of material 152 and the third layer of material 153.

The method 200 may also include varying the temperature of the object 150 in response to the temperature measured by the first temperature sensor 130, as at 214. The temperature of the object 150 may be varied during and/or after the printing process. As mentioned above, during the printing process, it may be desirable to maintain the temperature of the material being deposited within a first predetermined range, and/or the temperature of the substrate 112 and/or previously-printed layer upon which the material is being deposited within a second predetermined range. The first predetermined range may be from about 500° C. to about 800° C. or about 550° C. to about 700° C., and the second predetermined range may be from about 300° C. to about 650° C. or about 300° C. to about 500° C. These ranges may provide optimal bonding properties of the layers of material 151-153.

The temperature of the object 150 may be increased using, for example, a heater 170. The heater 170 may be or include a convection heater that may be used to increase the temperature of the substrate 112, the first layer of material 151, the second layer of material 152, the third layer of material 153, or a combination thereof. The temperature of the object 150 may also or instead be decreased using, for example, a cooler 172. The cooler 172 may be a forced convective air stream from a system including one or more of: a heat exchanger, water or coolant chiller, thermoelectric cooler, cryogenic cooler, or Ranque-Hilsch vortex tube that may be used to decrease the temperature of the substrate 112, the first layer of material 151, the second layer of material 152, the third layer of material 153, or a combination thereof.

In another embodiment, instead of, or in addition to, varying the temperature of the object 150, the temperature of the material being deposited may be varied. More particularly, the temperature of the material in the 3D printer 120 may be varied (e.g., increased or decreased). In yet another embodiment, instead of, or in addition to, varying the temperature of the object 150 or the material in the 3D printer 120, the speed of the 3D printer 120 may be varied. For example, the speed of the 3D printer 120 may be increased, which may reduce the time that the previously-printed layer has to cool. Thus, increasing the speed of the 3D printer 120 may cause the temperature of the previously-printed layer to be greater than it would be at the previous printing speed. In another example, the speed of the 3D printer 120 may be decreased, which may increase the time that the previously-printed layer has to cool. Thus, decreasing the speed of the 3D printer 120 may cause the temperature of the previously-printed layer to be lesser than it would be at the previous printing speed.

Figure 7:
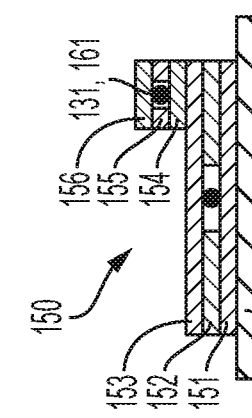
FIG. 7 depicts a perspective view of the object after additional layers have been added, according to an embodiment.

In at least one embodiment, the method 200 may also include depositing one or more additional layers of material (three layers are shown: 154-156) using the 3D printer 120, as at 216. This is shown in FIG. 7. For example, the fourth layer of material 154 may be deposited onto the third layer of material 153, the fifth layer of material 155 may be deposited onto the fourth layer of material 154, and the sixth layer of material 156 may be deposited onto the fifth later of material 155.

The layers of material 151-153 may be substantially uniform. In other words, the layers of material 151-153 may have substantially the same length, width, and depth/thickness. However, in the embodiment shown in FIG. 7, the additional layers of material 154-156 may have a different length, width, and/or depth/thickness. For example, the layers 154-156 may have a lesser length and a lesser width. This difference in size may cause the layers of material 154-156 to cool at a different rate than the layers of material 151-153. More particularly, the lesser length and/or lesser width may cause the layers of material 154-156 to cool more rapidly than the layers of material 151-153.

The method 200 may also include forming a recess 161 in the fifth layer of material 155, as at 218. This is also shown in FIG. 7. This may be similar to step 206 and is not described again here in detail. The method 200 may also include positioning at least a portion of a second temperature sensor 131 at least partially into the recess 161, as at 220. This is also shown in FIG. 7. This may be similar to step 208 and is not described again here in detail.

Thus, two or more temperature sensors (two are shown: 130, 131) may be placed in contact with the object 150 at/in different locations. As described above, the first temperature sensor 130 may be positioned at least partially within the object 150 at a first location where the object 150 has a first size. More particularly, the first temperature sensor 130 may be positioned (e.g., embedded) at least partially between the first layer of material 151 and the third layer of material 153. The second temperature sensor 131 may be positioned at least partially within the object 150 at a second location where the object 150 has a second size that is different than the first size (e.g., a different length, width, and/or depth/thickness). More particularly, the second temperature sensor 131 may be positioned (e.g., embedded) at least partially between the fourth layer of material 154 and the sixth layer of material 156.

The method 200 may also include measuring a temperature of the object 150 using the second temperature sensor 131, as at 222. As mentioned above, this may yield measurements that indicate that one or more of the layers of material 151-153 are cooling at a different (e.g., slower) rate than one or more of the layers of material 154-156 due to the different sizes.

The method 200 may also include varying the temperature of the object 150 in response to the temperature measured by the second temperature sensor 131, as at 224. When the temperature measured at 222 indicates that the layers of material 154-156 are cooling at a different (e.g., slower) rate than the temperature measured at 212 for the layers of material 151-153, then the varying of the temperature at 224 may differ from the varying of the temperature at 214. For example, the heater 170 may provide more heat to the layers of material 154-156 than it does/did to the layer of material 151-153 to maintain substantially uniform cooling of all of the layers of material 151-156.

Figure 8:
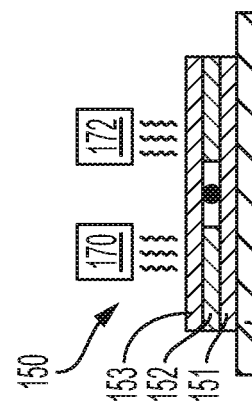
FIG. 8 depicts a perspective view of a non-contact temperature sensor determining the temperature of the object, according to an embodiment.

In at least one embodiment, the method 200 may also include measuring the temperature of the object 150 using a third temperature sensor 180, as at 226. This is shown in FIG. 8. The third temperature sensor 180 may be a non-contact temperature sensor that is configured to measure the temperature of the object 150 without contacting the object 150. The third temperature sensor 180 may be or include a pyrometer that focuses on a particular portion of a surface area of the object 150 and measures the temperature thereof without contacting the object 150.

The third temperature sensor 180 may be configured to measure the temperature of the object 150 in substantially the same location as the first temperature sensor 130 and/or the second temperature sensor 131. As used herein, substantially the same location refers to within about 10 mm or less, within about 5 mm or less, within about 3 mm or less, or within about 1 mm or less. When the first temperature sensor 130 is embedded between two or more of the layers of material 151-153, the third temperature sensor 180 may be pointed at the first temperature sensor 130. For example, the third temperature sensor 180 may be focused on a portion of the third layer of material 153 that is directly adjacent to (e.g., above) the first temperature sensor 130. Thus, the distance between the first temperature sensor 130 and the location where the third temperature sensor 180 is focused may be about the thickness of the third layer of material 153.

The third temperature sensor 180 may measure the temperature of the object 150 during and/or after the 3D printing process. In one embodiment, the third temperature sensor 180 may measure the temperature of the first layer of material 151 before, simultaneously with, and/or after the second layer of material 152 is deposited thereon. In another embodiment, the third temperature sensor 180 may measure the temperature of the second layer of material 152 before, simultaneously with, and/or after the third layer of material 153 is deposited thereon. In another embodiment, the third temperature sensor 180 may measure the temperature of the third layer of material 153 simultaneously with and/or after the third layer of material 153 is deposited. In yet another embodiment, the third temperature sensor 180 may measure the temperature of the first layer of material 151, the second layer of material 152, the third layer of material 153, or a combination thereof after the object 150 has finished cooling (e.g., at an ambient temperature) and/or after the object 150 has solidified.

As mentioned above, a non-contact temperature sensor may sometimes be inaccurate. Thus, the method 200 may also include calibrating the third temperature sensor 180 using the measurement(s) from the first temperature sensor 130, as at 228. The calibration may include creating or altering lookup tables or equations that correlate data collected by the third temperature sensor 180 to a temperature reading (e.g., from the first temperature sensor 130). For example, the third temperature sensor 180 may collect and measure the strength of infrared radiation from the object 150 at one or more specific wavelengths, and use lookup tables or equations programmed into the third temperature sensor 180 or the controller to output a temperature or temperature range to a user. In one embodiment, the system 100 is able to print pre-programmed test objects 150 that contain temperature sensors 130 and/or 131 and automatically compare the temperature data from those sensors 130, 131 to values obtained from the third temperature sensor 180 in order to automatically improve the accuracy of the readings from the third temperature sensor 180. In another embodiment, the user collects the data from temperature sensors 130 and/or 131 and uses that data to adjust the third temperature sensor 180. The temperature sensors 130, 131 may be used during manufacture of the printer 120 to calibrate the third temperature sensor 180 before sending to a customer. Alternatively, if a customer is going to be printing a large quantity of the same or similar objects, they may use this method to dial in the system 100 for that geometry and ensure the larger batch comes out with highest quality.

Measuring a Temperature of the Object after Printing is Completed

After the object 150 has been printed (i.e., the printing process is complete), the object 150 may cool and solidify, and the layers 151-156 may bond together. The object 150 may then be removed from the substrate 112. The sensor(s) 130, 131 may remain in contact with (e.g., at least partially embedded within) the object 150 while the object 150 cools and solidifies and thereafter. In addition to measuring the temperature of the object 150 as the object 150 is being printed, as described above, the temperature sensor(s) 130, 131 may also or instead be used to measure the temperature of the object 150 after the object 150 has been printed, as described below.

In one embodiment, the object 150 may be or include a standalone object that is not coupled to anything else such as a container that stores food and/or drinks, a container that cooks food and/or drinks, a hand tool, or the like. In another embodiment, the object 150 may be configured to be coupled to something else such as a vehicle, a turbine, a battery pack, a heat sink, a heat exchanger, an electric motor, a combustion engine, an enclosure for an electronic device, a power tool, a fluid control valve, a fluid fitting or coupler, a power conductor, a structural component, or the like. For example, the object 150 may be a gusset on the vehicle, a fuel nozzle on the vehicle, a part of an engine or motor of the vehicle, or the like. In the embodiments above, the object 150 may have a primary function (e.g., the gusset may be a structural support on the vehicle), and measuring the temperature may be a secondary function of the object 150. However, in other embodiments, the primary function of the object 150 may be measuring the temperature. For example, the object 150 may be or include a customized temperature probe that is shaped (e.g., during the method 200 described above) to have a sheath shape, a thermal interface, or a physical mounting that is customized for standalone use or installation into a larger system. Forming this shape, interface, and/or mounting using the 3D printer 120 may allow for more customization and integrate the probe directly into the sheath without secondary operations.

Figure 9:
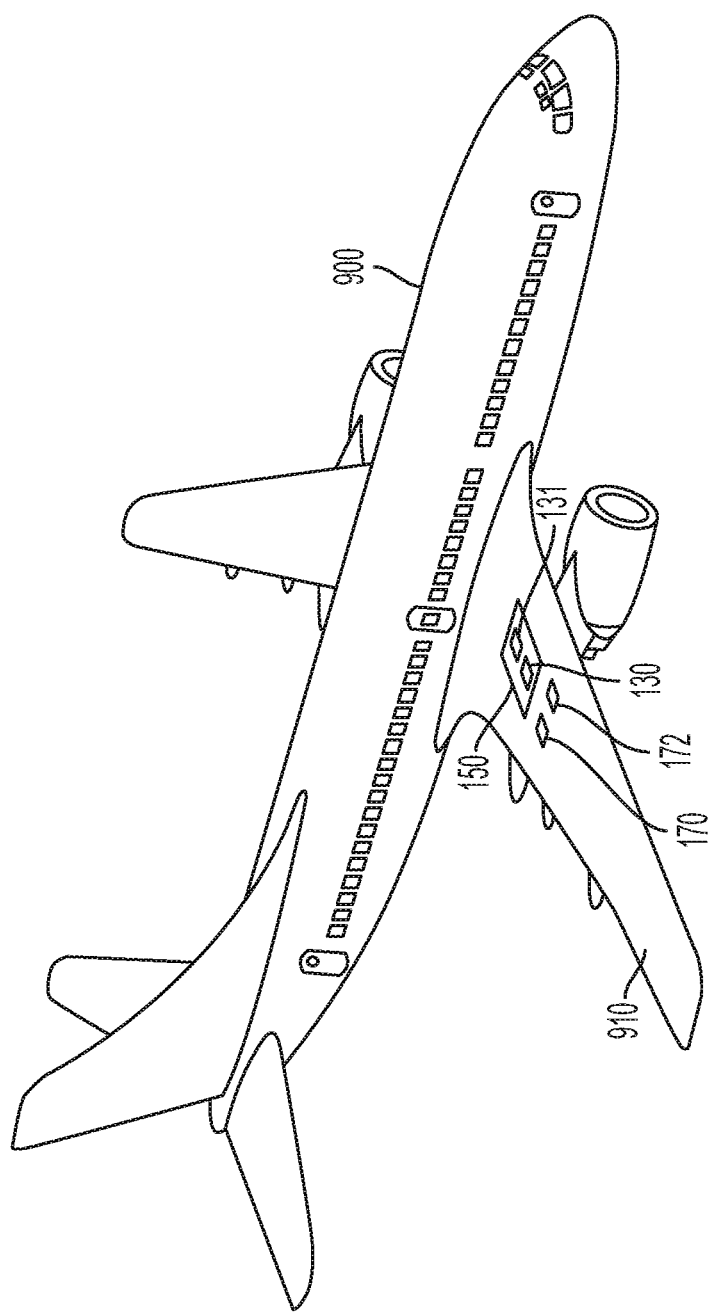
FIG. 9 depicts a side view of a vehicle with the object coupled thereto, according to an embodiment.

FIG. 9 depicts a side view of a vehicle 900 with the object 150 coupled thereto, according to an embodiment. After the object 150 cools and solidifies, the object 150 may be coupled to the vehicle 900. The object 150 may be coupled to an exterior of the vehicle 900, or the object 150 may be coupled to or otherwise positioned within the vehicle 900. The vehicle 900 may be or include a car, a truck, a bus, a train, a boat, an airplane, a helicopter, a drone, a spacecraft, etc. The object 150 may be a metallic (e.g., aluminum) component on/in the vehicle 900. In the example shown, the vehicle 900 is an aircraft (e.g., an airplane), and the object 150 is a gusset on a wing 910 of the airplane 900. Although reference number 900 refers to a vehicle, it may also or instead refer to any other item to which the object 150 may be coupled (e.g., a turbine, battery pack, heat sink, etc.).

Figure 10:
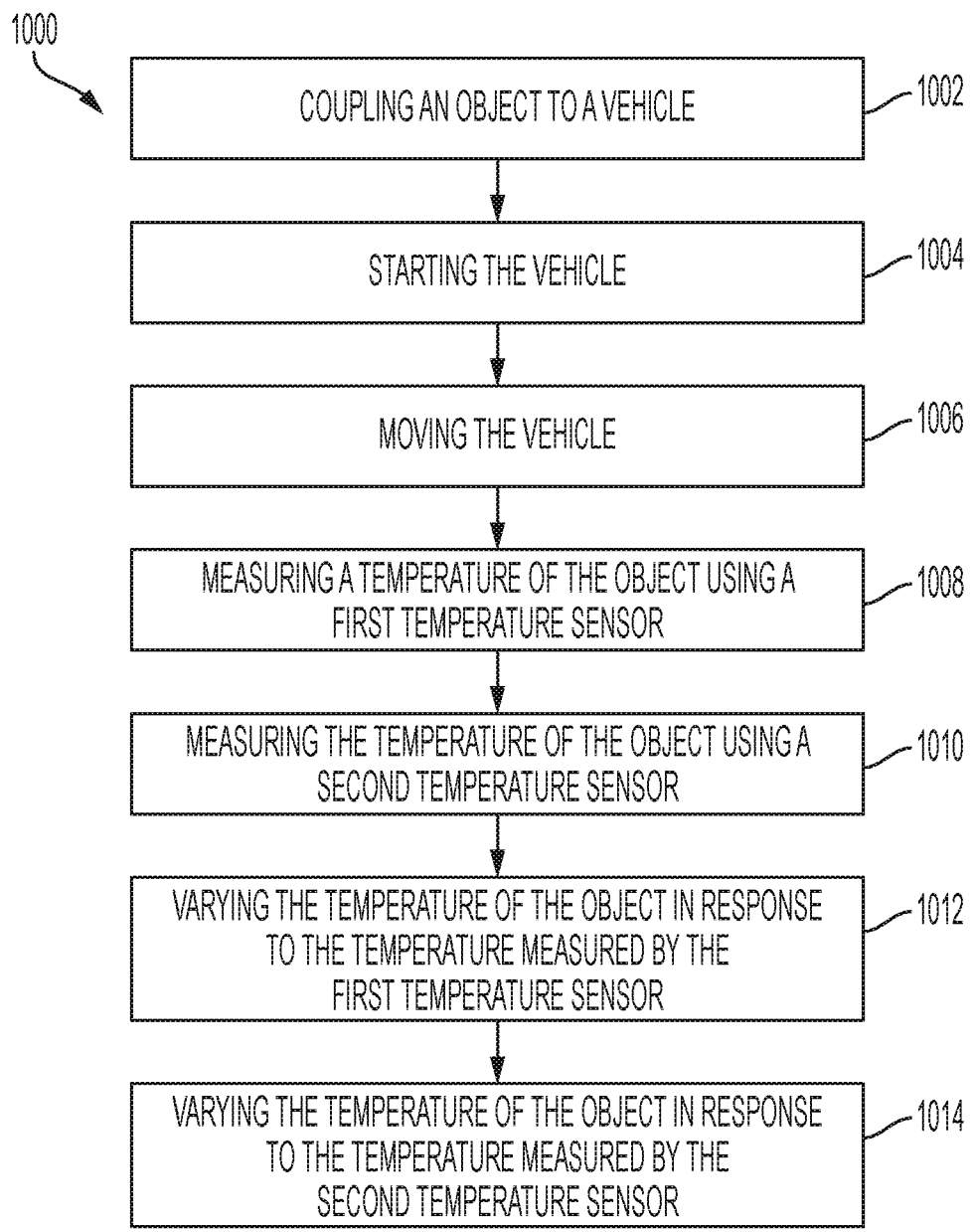
FIG. 10 depicts a flowchart of a method for determining a temperature of the object when the vehicle is in use, according to an embodiment.

FIG. 10 depicts a flowchart of a method 1000 for determining a temperature of the object 150 after the object 150 has been printed, according to an embodiment. An illustrative order of the method 1000 is provided below; however, it will be appreciated that one or more steps of the method 1000 may be repeated, performed in a different order, and/or omitted altogether.

The method 1000 may include coupling the object 150 to the vehicle 900, as at 1002. The object 150 may be coupled to the vehicle 900 using a mechanical fastener (e.g., a screw, a nut, a bolt, a nail, a strap, etc.), an adhesive, or the like.

The method 1000 may also include starting the vehicle 900, as at 1004. Once the vehicle 900 is started, the vehicle 900 may be "in use" which is also referred to as an "on" state. The method 1000 may also include moving the vehicle 900, as at 1006. The vehicle 900 may move on the ground (e.g., taxi on a runway) and/or may move in the air (e.g., in flight). If the object 150 is a standalone object, then one or more steps (e.g., 1002, 1004, 1006) may be omitted.

The method 1000 may also include measuring a temperature of the object 150 using the first temperature sensor 130, as at 1008. The method 1000 may also or instead include measuring the temperature of the object 150 using the second temperature sensor 131, as at 1010. The temperature of the object 150 may be measured before the vehicle 900 is started, while the vehicle 900 is in the on state, and/or after the vehicle 900 is turned into an off state. The temperature of the object 150 may also or instead be measured before the vehicle 900 moves, while the vehicle 900 is moving, and/or after the vehicle 900 has finished moving.

As mentioned above with reference to FIGS. 7 and 8, the first and second temperature sensors 130, 131 may be in contact with (e.g., coupled to and/or embedded within) different portions of the object 150. More particularly, the first temperature sensor 130 may be in contact with a first portion of the object 150 that has a first size (e.g., length, width, and/or thickness), and the second temperature sensor 131 may be in contact with a second portion of the object 150 that has a second size that is different than the first size. In the example shown in FIGS. 7 and 8, the first portion may be or include the layers 151, 152, 153, or a combination thereof, and the second portion may be or include the layers 154, 155, 156, or a combination thereof. In this particular example, the second portion has a lesser size (e.g., length and/or width) than the first portion and thus may heat and/or cool more quickly than the first portion. Thus, the temperature sensors 130, 131 may measure different temperatures at the same time, even when exposed to the same ambient temperature.

The object 150 may be designed to maintain (e.g., operate within) a predetermined temperature range (e.g., a normal operating range) after the object 150 has been printed, which may have a lower limit and an upper limit. In an example where the object 150 is a gusset on the wing 910, the lower limit may be about −56° C., and the upper limit may be about 510° C. In another example where the object 150 is a component in/on a jet engine or an exhaust of an aircraft, the upper limit may be about 2000° C. In yet another example where the object 150 is a component in/on a spacecraft (e.g., a satellite in orbit around the Earth), the lower limit may be about −250° C. or about −170° C., and the upper limit may be about 130° C. or about 300° C. In yet another example where the object 150 is a component in/on a space capsule, rocket, or spaceplane, the lower limit may be about −250° C., and the upper limit may be about 2700° C.

The method 1000 may also include varying the temperature of the object 150 in response to the temperature measured by the first temperature sensor 130, as at 1012. The temperature of the object 150 may also or instead be varied in response to the temperature measured by the second temperature sensor 131, as at 1014. In an embodiment, if the temperature of the object 150 is less than the lower limit, the temperature of the object 150 may be increased using, for example, the heater 170 (or another heater). If the temperature of the object 150 is greater than the upper limit, the temperature of the object 150 may be decreased using, for example, the cooler 172 (or another cooler). The heater 170 and/or the cooler 172 may be coupled to the vehicle 900.

In another embodiment where the vehicle 900 is an aircraft, the temperature of the object 150 may be varied by adjusting the altitude and/or flight patterns of the vehicle 900 automatically or with partial user intervention. For example, in response to the measured temperature being below a lower limit (e.g., such that ice may form on the object 150 and/or the wing 910), the altitude of the vehicle 900 may be reduced to a level where warmer air exists. In another example, in response to the measured temperature being above an upper limit, the altitude of the vehicle 900 may be increased to a level where colder air exists. In another example, in response to the measured temperatures being below the lower limit, the flight pattern of the vehicle 900 may be adjusted based at least partially upon weather and/or atmosphere data to fly through warmer air. In another example, in response to the measured temperatures being above the upper limit, the flight pattern of the vehicle 900 may be adjusted based at least partially upon weather and/or atmosphere data to fly through colder air.

In an embodiment where the vehicle 900 is a car with a combustion engine, the object 150 may be designed to operate at an upper limit of about 280° C., or to be exposed to combustion reactions with an upper limit of about 2500° C. In response to the measured temperature being above the upper limit, an operator of vehicle 900 (e.g., the driver) may be notified or instructed to reduce the power output of the engine in vehicle 900, or shut off power to vehicle 900. In an embodiment where vehicle 900 is powered by a diesel engine, the temperature of the engine or the diesel fuel may be designed to operate above a lower limit (e.g., the known cloud point of the diesel fuel in the vehicle 900), below which the vehicle 900 may have difficulty starting or operating. In response to the measured temperature being below the lower limit, the operator of the vehicle 900 may be notified or instructed to turn on the heater 170 (or another heater). In an embodiment where the vehicle 900 includes an electric propulsion system, a battery pack, battery enclosure, electronics enclosure, motor, transmission, etc., one or more of these components may be designed to operate within a predetermined temperature range during storage or operation. In response to the measured temperature being outside of the predetermined temperature range, the operator of the vehicle 900 may be notified or instructed to adjust the heater 170 and/or the cooler 172 or to adjust the power output of the vehicle 900.

In an embodiment, the temperatures measured by the sensor(s) 130, 131 may be transmitted to a computing system (e.g., in the vehicle 900), and the computing system may then actuate the heater 170, actuate the cooler 172, and/or vary the altitude or flight pattern in response to the measured temperatures. The computing system may also or instead alert an operator (e.g., driver or pilot) of vehicle 900 that the measured temperatures that are within or outside of the predetermined temperature range, for example, by turning alert lights on or off or displaying messages on a user interface. The computing system may also or instead record the measured temperatures to a memory storage device within vehicle 900 such as a black box recorder, a hard drive, a flash memory, or another storage device. The computing system may also or instead transmit the measured temperatures to another system outside of the vehicle 900, such as to a central database or central control center. In the example where the vehicle 900 is an aircraft, the central database or central control center may be to an air traffic control station.

As mentioned above, the temperature sensors 130, 131 may measure different temperatures at the same time. If, for example, one temperature sensor (e.g., the first temperature sensor 130) measures a temperature that is within the predetermined temperature range, and the other temperature sensor (e.g., the second temperature sensor 131) measures a temperature that is less than the lower limit of the predetermined temperature range, then the temperature of the object 150 may be increased using any of the techniques discussed above. In another example, if one temperature sensor (e.g., the first temperature sensor 130) measures a temperature that is within the predetermined temperature range, and the other temperature sensor (e.g., the second temperature sensor 131) measures a temperature that is greater than the upper limit of the predetermined temperature range, then the temperature of the object 150 may be decreased using any of the techniques discussed above.

Thus, the temperature sensor(s) 130, 131 may be used to measure the temperature of the object 150 during the 3D printing process (e.g., as described at 212 and/or 222 in FIG. 2), after the 3D printing process (as described at 1008 and/or 1010 in FIG. 10), or both.

Measuring a Temperature of the Object Using the Object as Part of the Thermocouple The embodiments above use temperatures sensors (e.g., thermocouples) 130, 131, 180 that function as standalone sensors that is/are placed in contact with (e.g., embedded in) the object 150 during the 3D printing process. In an example, before being placed in contact with the object 150, these temperature sensors 130, 131, 180 may be coupled to and/or part of a reader (e.g., a thermocouple reader) and used to measure a temperature of the air, a temperature of a human body (e.g., when pinched between two fingers), etc. As mentioned above, thermocouples work by having two electrical conductors (e.g., wires) that are made of dissimilar materials (e.g., metals), and the dissimilar materials have a difference in electronegativity. The embodiments below use the object 150 as one of the two dissimilar metals that form the thermocouple.

Figure 11:
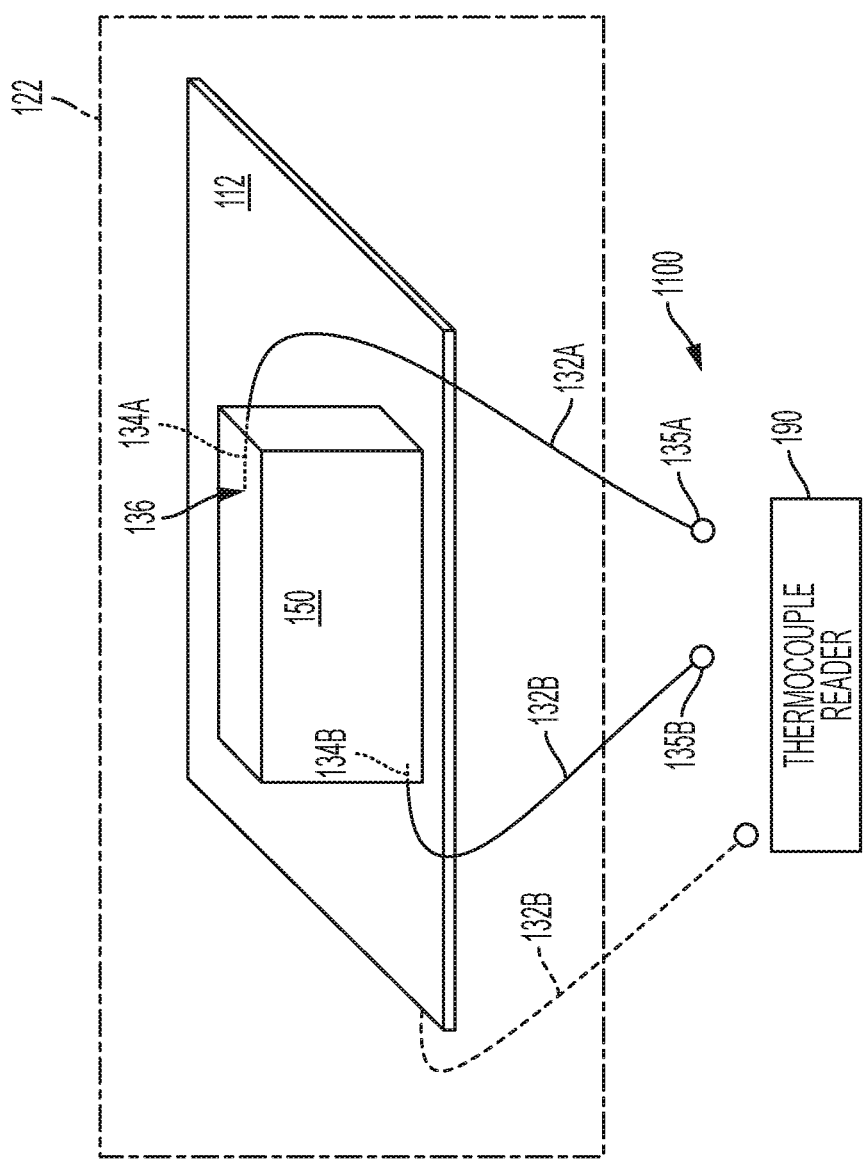
FIG. 11 depicts a perspective view of another system for determining the temperature of the object, according to an embodiment.

FIG. 11 depicts a perspective view of a system 1100 for determining the temperature of the object 150, according to an embodiment. The system 1100 may include a first electrical conductor 132A, a second electrical conductor 132B, and a thermocouple reader 190. In an example, the electrical conductors 132A, 132B and/or the thermocouple reader 190 may be configured to measure the temperature of the object 150 during and/or after printing of the object 150.

At least a portion of the electrical conductors 132A, 132B and the object 150 may be positioned within a heated zone 122. Another portion of the electrical conductors 132A, 132B and the thermocouple reader 190 may be positioned outside of the heated zone 122. The heated zone 122 may be or include an area or volume that may have an elevated gas (e.g., air) temperature during printing of the object 150. The elevated temperature may be greater than a predetermined threshold. The predetermined threshold may be about 30° C., about 50° C., or about 100° C. In one example, the heated zone 122 may be within the 3D printer 120.

The first electrical conductor 132A may be in contact with the object 150 during and/or after the printing of the object 150. More particularly, a first end 134A of the first electrical conductor 132A may be embedded within the object 150 during the printing of the object 150, as described above. Thus, the first end 134A and the object 150 may be positioned within the heated zone 122. The point where the first end 134A is in contact with the object 150 may be referred to as a first junction 136. The first electrical conductor 132A may be made of a different material than the object 150. The first electrical conductor 132A may also or instead have a different electronegativity value than the object 150. In an example, the difference in electronegativity values may be greater than or equal to a predetermined value. The predetermined value may be from about 0.1 to about 0.5 or about 0.2 to about 0.4. For example, the predetermined value may be about 0.3.

The second electrical conductor 132B may also be in contact with the object 150 during and/or after the printing of the object 150. More particularly, a first end 134B of the second electrical conductor 132B may be embedded within the object 150 during the printing of the object 150, as described above. Thus, the first end 134B may also be positioned within the heated zone 122. As shown, the first ends 134A, 134B may be in contact with different portions (e.g., different layers 151-156) of the object 150. The different portions may have different temperatures (e.g., due to being printed at different times). The second electrical conductor 132B may be made of substantially the same material as the object 150. The second electrical conductor 132B may also or instead have substantially the same electronegativity value as the object 150. In an example, the difference in electronegativity values between the second electrical conductor 132B and the object 150 may be less than or equal to the predetermined value.

In another embodiment (shown in dashed lines), the second electrical conductor 132B may instead be in contact with the substrate (e.g., base plate) 112 during and/or after the printing of the object 150. Thus, the first end 134B may be positioned within the heated zone 122. In this embodiment, the second electrical conductor 132B and/or the substrate 112 may be made of substantially the same material as the object 150. In this embodiment, the second electrical conductor 132B and/or the substrate 112 may also or instead have substantially the same electronegativity value as the object 150. For example, the difference in electronegativity values between the second electrical conductor 132B and the object 150 may be less than or equal to the predetermined value, and/or the difference in electronegativity values between the substrate 112 and the object 150 may be less than or equal to the predetermined value.

Figure 12:
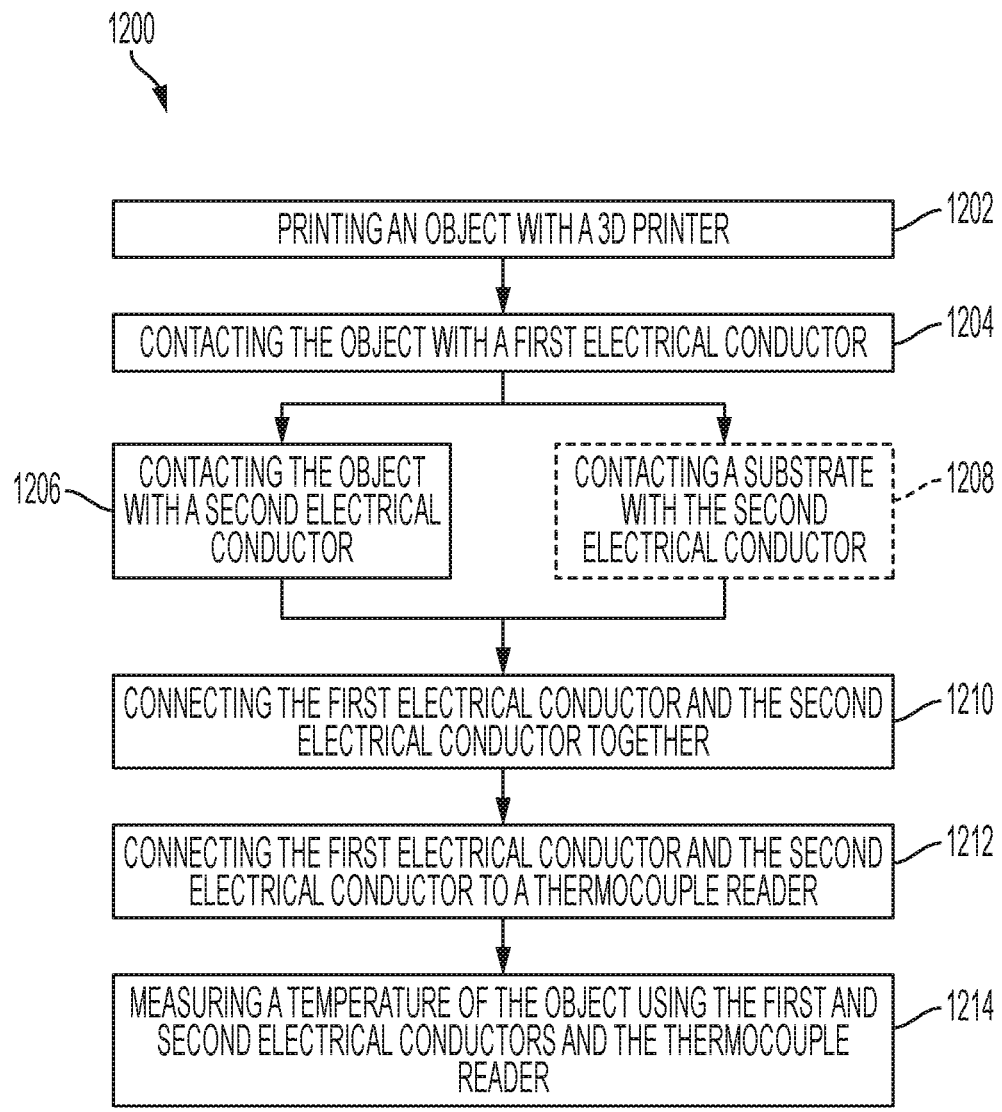
FIG. 12 depicts a flowchart of another method for determining the temperature of the object, according to an embodiment.

FIG. 12 depicts a flowchart of a method 1200 for determining the temperature of the object 150, according to an embodiment. An illustrative order of the method 1200 is provided below; however, it will be appreciated that one or more steps of the method 1200 may be repeated, performed in a different order, and/or omitted altogether.

The method 1200 may include printing the object 150 with the 3D printer 120, as at 1202. This may be similar to at least a portion of the method 200 described above with reference to FIGS. 2A, 2B, and 3-8.

The method 1200 may also include contacting the object 150 with the first electrical conductor 132A, as at 1204. More particularly, this may include embedding the first end 134A of the first electrical conductor 132A at least partially within the object 150 during the printing of the object 150. This may be similar to steps 202-210 in FIG. 2A and FIGS. 3-6, as described above. The first electrical conductor 132A may be in contact with the object 150 during and/or after the printing of the object 150.

The method 1200 may also include contacting the object 150 with the second electrical conductor 132B, as at 1206. More particularly, this may include embedding the first end 134B of the second electrical conductor 132B at least partially within the object 150 during the printing of the object 150. This may be similar to steps 216-220 in FIG. 2B and FIG. 7, as described above. The second electrical conductor 132B may be in contact with the object 150 during and/or after the printing of the object 150.

Optionally, step 1206 may be omitted, and the method 1200 may instead include contacting the substrate 112 with the second electrical conductor 132B, as at 1208. In this embodiment, the second electrical conductor 132B may be in contact with the substrate 112 during and/or after the printing of the object 150.

The method 1200 may also include connecting the first electrical conductor 132A and the second electrical conductor 132B, as at 1210. More particularly, this may include connecting a second end 135A of the first electrical conductor 132A and a second end 135B of the second electrical conductor 132B. This connection may be referred to as a second (e.g., reference) junction. The second ends 135A, 135B and/or the second junction may be located outside of the heated zone 122 (e.g., outside of the 3D printer 120). The gas (e.g., air) temperature around the second junction (e.g., outside of the heated zone 122) may be less than the temperature around first junction 136 (e.g., inside the heated zone 122). For example, the temperature around the second junction may be less than threshold (e.g., less than about 100° C., less than about 50° C., or less than about 30° C.).

The method 1200 may also include connecting the first electrical conductor 132A and the second electrical conductor 132B to the thermocouple reader 190, as at 1212. More particularly, the second ends 135A, 135B may be connected to the thermocouple reader 190.

The method 1200 may also include measuring a temperature of the object 150 using the first and second electrical conductors 132A, 132B and the thermocouple reader 190, as at 1214. A thermocouple is formed at the first junction 136 (e.g., at the interface between the first end 134A of the first electrical conductor 132A and the object 150). The thermocouple reader 190 may be configured to measure a temperature at the first junction 136 (e.g., in relation to the second junction) to determine the temperature of the object 150 proximate to the first junction 136.

Figure 13:
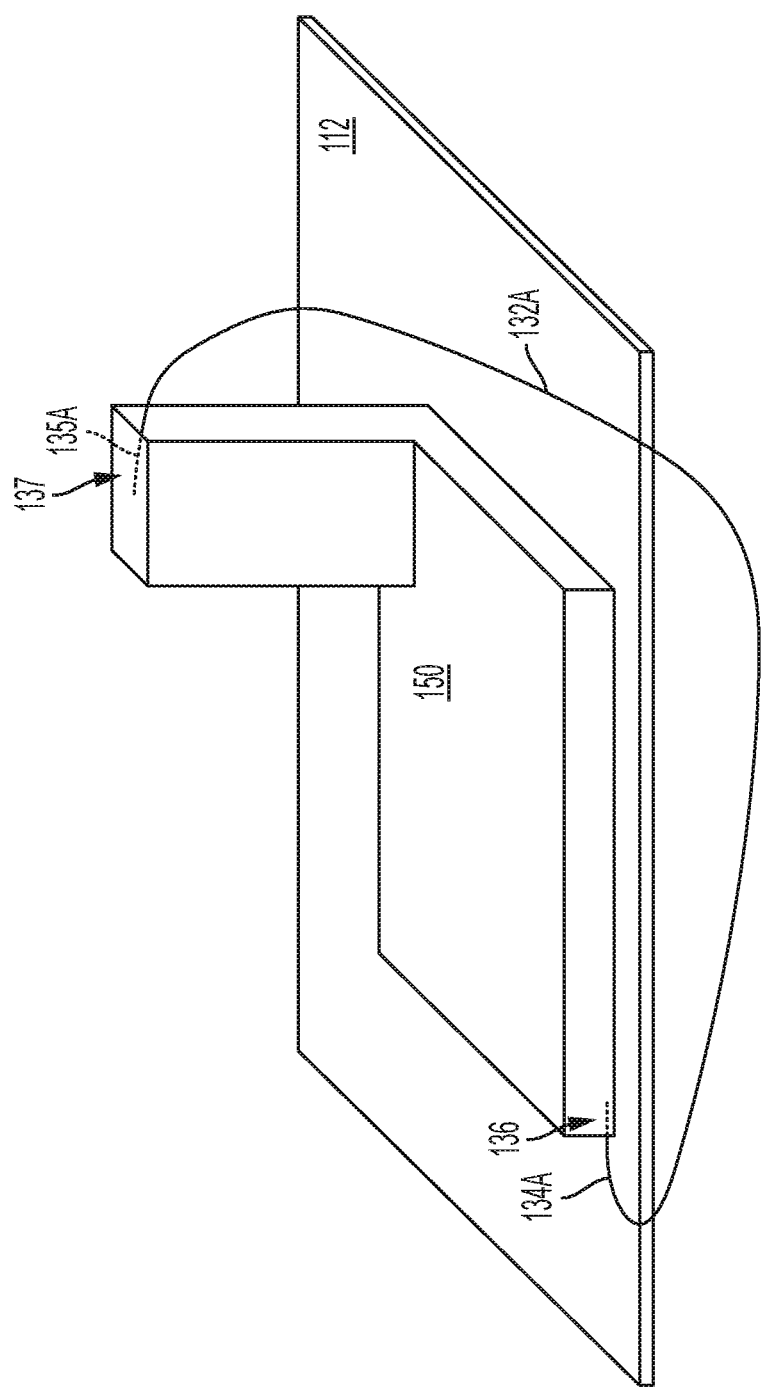
FIG. 13 depicts a perspective view of another system for determining a temperature differential between two portions of the object, according to an embodiment.

FIG. 13 depicts a perspective view of a system 1300 for determining a temperature differential between two portions of the object 150, according to an embodiment. The system 1300 may include a single electrical conductor 132A.

The electrical conductor 132A may be in contact with the object 150 during and/or after the printing of the object 150. The first end 134A of the electrical conductor 132A may be in contact with (e.g., embedded within) the object 150 during the printing of the object 150. More particularly, the first end 134A may be in contact one or more of layers 153-153, as shown in FIGS. 3-6. For example, the first end 134A may be positioned at least partially within the recess 160. The point where the first end 134A is in contact with the object 150 may be referred to as the first junction 136.

The second end 135A of the electrical conductor 132A may also be in contact with (e.g., embedded within) the object 150 during the printing of the object 150. The second end 135A may be embedded within a different portion of the object 150 than the first end 134A. More particularly, the second end 135A may be in contact one or more of layers 154-156, as shown in FIGS. 7 and 8. For example, the second end 135A may be positioned at least partially within the recess 161. The point where the second end 135A is in contact with the object 150 may be referred to as the second junction 137.

The electrical conductor 132A may be made of a different material than the object 150. The electrical conductor 132A may also or instead have a different electronegativity value than the object 150. In an example, the difference in electronegativity values may be greater than or equal to a predetermined value. The predetermined value may be from about 0.1 to about 0.5 or about 0.2 to about 0.4. For example, the predetermined value may be about 0.3.

Figure 14:
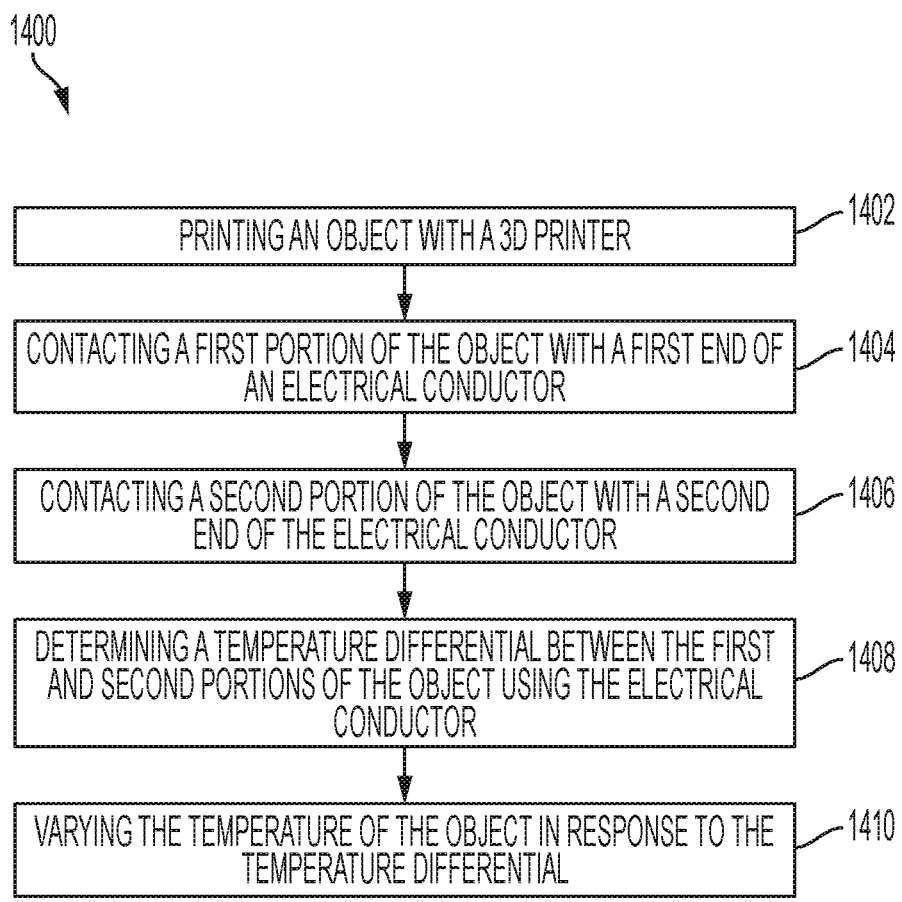
FIG. 14 depicts a flowchart of a method for determining the temperature differential between two portions of the object, according to an embodiment.

FIG. 14 depicts a flowchart of a method 1400 for determining a temperature differential between two portions of the object 150, according to an embodiment. An illustrative order of the method 1400 is provided below; however, it will be appreciated that one or more steps of the method 1400 may be repeated, performed in a different order, and/or omitted altogether.

The method 1400 may include printing the object 150 with the 3D printer 120, as at 1402. This may be similar to at least a portion of the method 200 described above with reference to FIGS. 2A, 2B, and 3-8.

The method 1400 may include contacting a first portion of the object 150 with the first end 134A of the electrical conductor 132A, as at 1404. More particularly, this may include embedding the first end 134A at least partially within the object 150 during the printing of the object 150. This may be similar to steps 202-210 in FIG. 2A and FIGS. 3-6, as described above. The first end 134A of the electrical conductor 132A may be in contact with the object 150 during and/or after the printing of the object 150.

The method 1400 may also include contacting a second portion of the object 150 with the second end 135A of the electrical conductor 132A, as at 1406. More particularly, this may include embedding the second end 135A of the electrical conductor 132A at least partially within the object 150 during the printing of the object 150. This may be similar to steps 216-220 in FIG. 2B and FIG. 7, as described above. The second end 135A of the electrical conductor 132A may be in contact with the object 150 during and/or after the printing of the object 150.

As will be appreciated, the first and second portions of the object 150 may have different temperatures. For example, the first portion may be or include one or more of the layers 151-153, and the second portion may be or include one or more of the layers 154-156 (see FIGS. 3-8). As described above, the layers 151-153 may be deposited/printed before the layers 154-156, and thus the layers 151-153 may be cooler than the layers 154-156. In one embodiment, the temperature of the object 150 may be varied (e.g., using the substrate 112, the heater 170, and/or the cooler 172), as described above with respect to steps 214, 224. This may cause the first portion and the second portion of the object 150 to have different temperatures.

The method 1400 may also include determining a temperature differential between the first and second portions of the object 150 using the electrical conductor 132A, as at 1408. The temperature differential between the first and second portions (i.e., the first and second junctions 136, 137) may create an electro-motive force, which causes a variation (e.g., increase) in voltage that corresponds to the temperature differential. Thus, determining the temperature differential may include measuring a voltage differential between the first and second portions of the object 150 using the electrical conductor 132A. A lookup table and/or an equation may then be used to determine the temperature differential based at least partially upon the voltage differential.

In at least one embodiment, the method 1400 may also include varying the temperature of the object 150 in response to the temperature differential, as at 1410. This may be similar to step 214, 224, 1012, 1014, or a combination thereof, and for the sake of brevity, the details are not discussed again here.

Figure 15:
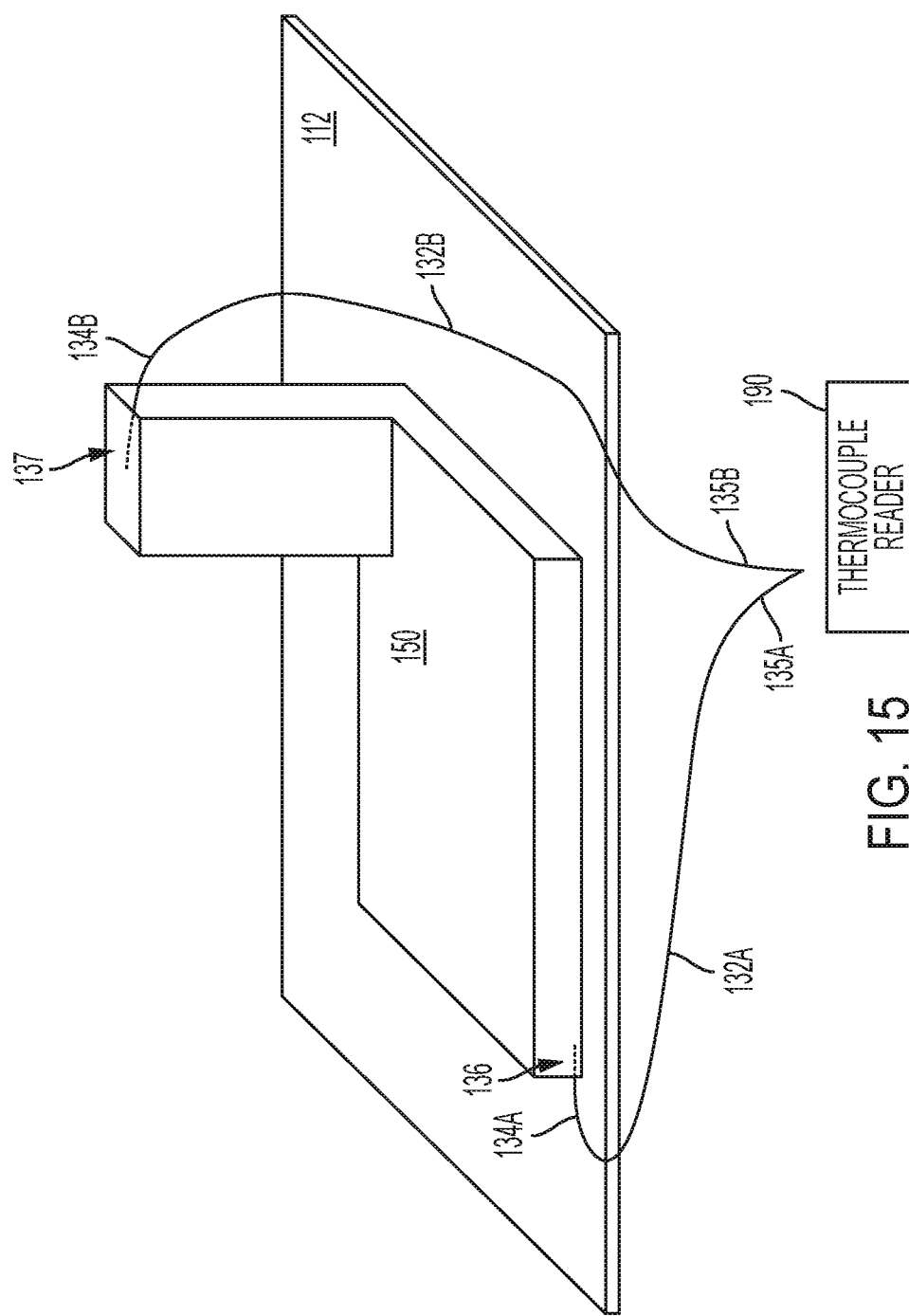
FIG. 15 depicts a perspective view of another system for determining the temperature differential between two portions of the object, according to an embodiment.

FIG. 15 depicts a perspective view of another system 1500 for determining the temperature differential between two portions of the object 150, according to an embodiment. The system 1500 is similar to the system 1300, except two electrical conductors 132A, 132B are used.

The first electrical conductor 132A may be in contact with the object 150 during and/or after the printing of the object 150. The first end 134A of the electrical conductor 132A may be in contact with (e.g., embedded within) the object 150 during the printing of the object 150. The first end 134A may be in contact one or more of layers 153-153, as shown in FIGS. 3-6. For example, the first end 134A may be positioned at least partially within the recess 160. The point where the first end 134A is in contact with the object 150 may be referred to as the first junction 136.

The second end 134B of the second electrical conductor 132B may also be in contact with (e.g., embedded within) the object 150 during the printing of the object 150. The second end 134B may be embedded within a different portion of the object 150 than the first end 134A. More particularly, the second end 134B may be in contact one or more of layers 154-156, as shown in FIGS. 7 and 8. For example, the second end 134B may be positioned at least partially within the recess 161. The point where the second end 134B is in contact with the object 150 may be referred to as the second junction 137.

The second end 135A of the first electrical conductor 132A and the second end 135B of the second electrical conductor 132B may be connected together. The electrical conductors 132A, 132B may be made of the same material, which may be a different material than the object 150. The electrical conductors 132A, 132B may also or instead have a different electronegativity value than the object 150. In an example, the difference in electronegativity values may be greater than or equal to a predetermined value. The predetermined value may be from about 0.1 to about 0.5 or about 0.2 to about 0.4. For example, the predetermined value may be about 0.3.

Figure 16:
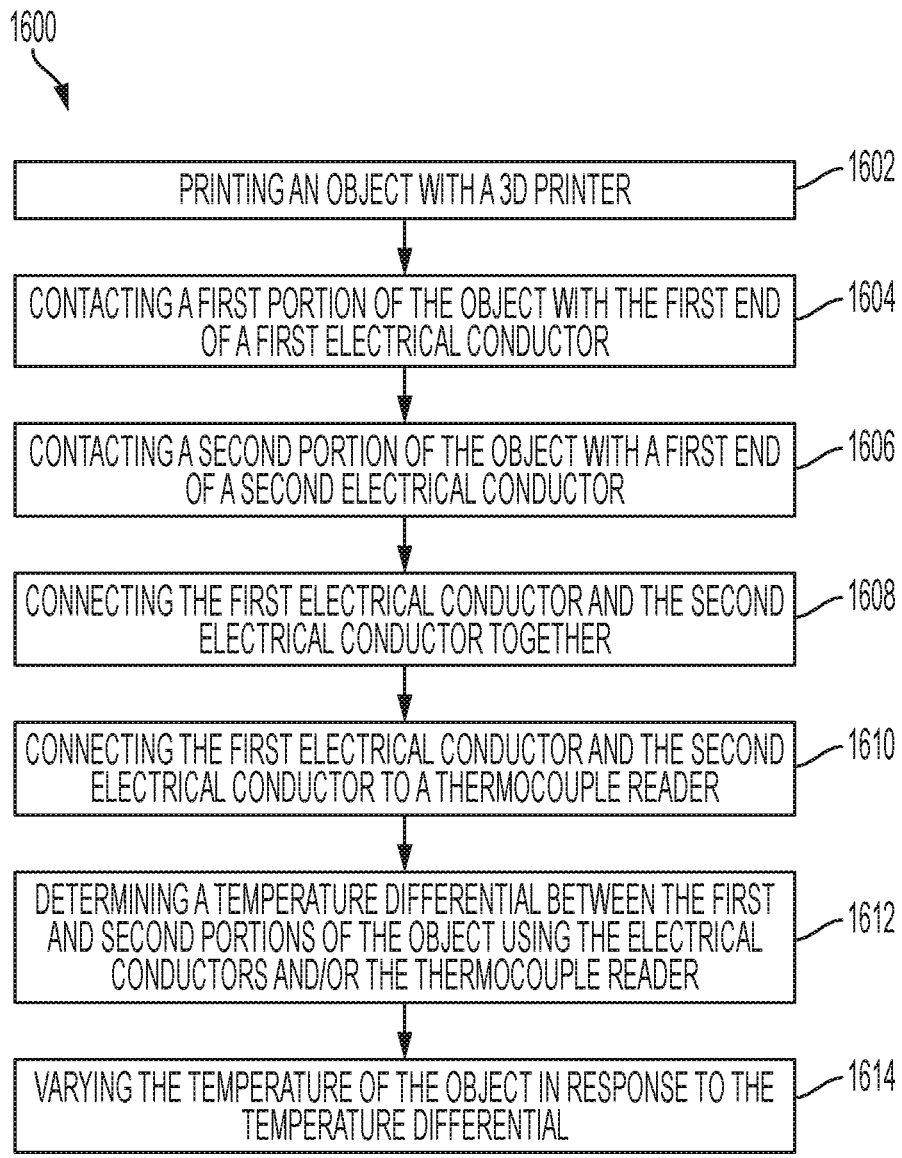
FIG. 16 depicts a flowchart of another method for determining the temperature differential between two portions of the object, according to an embodiment.

FIG. 16 depicts a flowchart of a method 1600 for determining the temperature differential between two portions of the object 150, according to an embodiment. An illustrative order of the method 1600 is provided below; however, it will be appreciated that one or more steps of the method 1600 may be repeated, performed in a different order, and/or omitted altogether.

The method 1600 may include printing the object 150 with the 3D printer 120, as at 1602. This may be similar to at least a portion of the method 200 described above with reference to FIGS. 2A, 2B, and 3-8.

The method 1600 may also include contacting a first portion of the object 150 with the first end 134A of the first electrical conductor 132A, as at 1604. More particularly, this may include embedding the first end 134A at least partially within the object 150 during the printing of the object 150. This may be similar to steps 202-210 in FIG. 2A and FIGS. 3-6, as described above. The first end 134A of the electrical conductor 132A may be in contact with the object 150 during and/or after the printing of the object 150.

The method 1600 may also include contacting a second portion of the object 150 with the first end 134B of the second electrical conductor 132B, as at 1606. More particularly, this may include embedding the first end 134B of the second electrical conductor 132B at least partially within the object 150 during the printing of the object 150. This may be similar to steps 216-220 in FIG. 2B and FIG. 7, as described above. The first end 134B of the second electrical conductor 132B may be in contact with the object 150 during and/or after the printing of the object 150.

As will be appreciated, the first and second portions of the object 150 may have different temperatures. For example, the first portion may be or include one or more of the layers 151-153, and the second portion may be or include one or more of the layers 154-156 (see FIGS. 3-8). As described above, the layers 151-153 may be deposited/printed before the layers 154-156, and thus the layers 151-153 may be cooler than the layers 154-156. In one embodiment, the temperature of the object 150 may be varied (e.g., using the substrate 112, the heater 170, and/or the cooler 172), as described above with respect to steps 214, 224. This may cause the first portion and the second portion of the object 150 to have different temperatures.

The method 1600 may also include connecting the first electrical conductor 132A and the second electrical conductor 132B, as at 1608. More particularly, this may include connecting the second end 135A of the first electrical conductor 132A and the second end 135B of the second electrical conductor 132B.

The method 1600 may also include connecting the first electrical conductor 132A and the second electrical conductor 132B to the thermocouple reader 190, as at 1610. More particularly, the second ends 135A, 135B may be connected to the thermocouple reader 190.

The method 1600 may also include determining a temperature differential between the first and second portions of the object 150 using the electrical conductors 132A, 132B and/or the thermocouple reader 190, as at 1612. The temperature differential between the first and second portions may create an electro-motive force, which causes a variation (e.g., increase) in voltage that corresponds to the temperature differential. Thus, determining the temperature differential may include measuring a voltage differential between the first and second portions of the object 150 using the electrical conductor 132A. A lookup table and/or an equation may then be used to determine the temperature differential based at least partially upon the voltage differential.

In at least one embodiment, the method 1600 may also include varying the temperature of the object 150 in response to the temperature differential, as at 1614. This may be similar to step 214, 224, 1012, 1014, or a combination thereof, and for the sake of brevity, the details are not discussed again here.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" may include any and all sub-ranges between (and including) the minimum value of zero and the maximum value of 10, that is, any and all sub-ranges having a minimum value of equal to or greater than zero and a maximum value of equal to or less than 10, e.g., 1 to 5.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method for determining a temperature of an object (150), the method comprising:
   printing the object using a three-dimensional (3D) printer, wherein the object comprises greater than 50% metal;
   measuring the temperature of the object using a first temperature sensor while the object is being printed by the 3D printer,
   wherein the first temperature sensor is in contact with the object; and
   measuring the temperature of the object using the first temperature sensor after the object has been printed by the 3D printer.

2. The method of claim 1, wherein printing the object comprises forming a recess in the object using the 3D printer, and where the method further comprises positioning the first temperature sensor at least partially within the recess while the object is being printed by the 3D printer such that the first temperature sensor becomes at least partially embedded within the object.

3. The method of claim 2, wherein the first temperature sensor remains embedded within the object after the object has been printed by the 3D printer.

4. The method of claim 1, further comprising varying the temperature of the object, in response to the temperature measured while the object is being printed, to maintain the object within a first predetermined temperature range.

5. The method of claim 4, further comprising varying the temperature of the object, in response to the temperature measured after the object has been printed, to maintain the object within a second predetermined temperature range, wherein the first predetermined temperature range is greater than the second predetermined temperature range.

6. The method of claim 1, further comprising:
   measuring the temperature of the object using a second temperature sensor while the object is being printed by the 3D printer, wherein the first and second temperature sensors are embedded at least partially within the object while the object is being printed by the 3D printer; and
   measuring the temperature of the object using the second temperature sensor after the object has been printed by the 3D printer.

7. The method of claim 6, wherein the first temperature sensor is embedded at least partially within a first portion of the object, wherein the second temperature sensor is embedded at least partially within a second portion of the object, and wherein the first portion is larger than the second portion such that the first portion heats, cools, or both at a slower rate than the second portion.

8. The method of claim 7, further comprising varying the temperature of the object when the temperature measured by the first temperature sensor after the object has been printed is within a predetermined range and the temperature measured by the second temperature sensor after the object has been printed is outside of the predetermined range.

9. The method of claim 1, further comprising coupling the object to a vehicle after the object has been printed, and wherein measuring the temperature of the object using the first temperature sensor after the object has been printed by the 3D printer comprises measuring the temperature of the object using the first temperature sensor after the object has been coupled to the vehicle.

10. The method of claim 9, further comprising varying a temperature of the object in response to the temperature measured after the object has been coupled to the vehicle using a heater, a cooler, or both that is coupled to the vehicle.

* * * * *